(12) United States Patent
Sankrithi et al.

(10) Patent No.: US 7,744,038 B2
(45) Date of Patent: Jun. 29, 2010

(54) CONTROLLABLE WINGLETS

(75) Inventors: Mithra M. K. V. Sankrithi, Lake Forest Park, WA (US); Joshua B. Frommer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 11/763,701

(22) Filed: Jun. 15, 2007

(65) Prior Publication Data

US 2008/0308683 A1 Dec. 18, 2008

(51) Int. Cl.
*B64C 23/06* (2006.01)

(52) U.S. Cl. .............. 244/199.4; 244/199.1; 244/199.2; 244/199.3

(58) Field of Classification Search .............. 244/199.1, 244/199.2, 199.3, 199.4
See application file for complete search history.

(56) References Cited

U.S. PATENT DOCUMENTS

| | | | | |
|---|---|---|---|---|
| 4,245,804 A * | 1/1981 | Ishimitsu et al. | ............... | 244/91 |
| 4,247,063 A * | 1/1981 | Jenkins | ......................... | 244/91 |
| 4,382,569 A * | 5/1983 | Boppe et al. | .............. | 244/199.4 |
| 4,598,885 A * | 7/1986 | Waitzman | ..................... | 244/13 |
| 4,671,473 A * | 6/1987 | Goodson | .................. | 244/199.4 |
| 4,722,499 A * | 2/1988 | Klug | ........................ | 244/199.4 |
| 4,808,246 A * | 2/1989 | Albrecht et al. | ............. | 148/527 |
| 5,114,104 A * | 5/1992 | Cincotta et al. | .............. | 244/219 |
| 5,275,358 A * | 1/1994 | Goldhammer et al. | ........ | 244/91 |
| 5,348,253 A * | 9/1994 | Gratzer | ........................ | 244/91 |
| 5,407,153 A * | 4/1995 | Kirk et al. | ................. | 244/199.4 |
| 5,634,613 A * | 6/1997 | McCarthy | ................. | 244/199.1 |
| 5,988,563 A * | 11/1999 | Allen | .......................... | 244/49 |
| 6,065,934 A * | 5/2000 | Jacot et al. | .................. | 416/155 |
| 6,182,929 B1 * | 2/2001 | Martin et al. | ............... | 244/219 |
| 6,345,790 B1 * | 2/2002 | Brix | ........................ | 244/199.4 |
| 6,394,397 B1 | 5/2002 | Ngo et al. | | |
| 6,427,948 B1 | 8/2002 | Campbell | | |
| 6,484,968 B2 * | 11/2002 | Felker | ......................... | 244/91 |
| 6,497,600 B1 * | 12/2002 | Levy et al. | ..................... | 446/34 |

(Continued)

FOREIGN PATENT DOCUMENTS

DE 10313290 A1 10/2004

(Continued)

OTHER PUBLICATIONS

Shelton et al, "Active Multiple Winglets for Improved Unmanned-Aerial-Vehicle Performance", Journal of Aircraft, vol. 43, No. 1, Jan.-Feb. 2006, p. 110-116.

(Continued)

*Primary Examiner*—Timothy D Collins
*Assistant Examiner*—Justin Benedik
(74) *Attorney, Agent, or Firm*—Lee & Hayes, PLLC (57) ABSTRACT

Systems and methods for providing variable geometry winglets to an aircraft are disclosed. In one embodiment, a winglet includes a base portion configured to attach to a wing. The winglet further includes a body portion. In turn, the body portion includes at least one of a deflectable control surface, a shape memory alloy (SMA) bending plate, and a SMA torque tube. The base portion is configured to attach to the wing such that the body portion projects at an upward angle from the wing.

20 Claims, 6 Drawing Sheets

Span-Wise Motion

U.S. PATENT DOCUMENTS

| | | | |
|---|---|---|---|
| 6,578,798 B1 * | 6/2003 | Dizdarevic et al. | 244/199.1 |
| 6,827,314 B2 * | 12/2004 | Barriety | 244/201 |
| 6,886,778 B2 * | 5/2005 | McLean | 244/45 R |
| 6,916,035 B2 * | 7/2005 | Houser et al. | 280/602 |
| 7,028,954 B2 * | 4/2006 | Van Dam et al. | 244/204 |
| 7,207,526 B2 * | 4/2007 | McCarthy | 244/199.4 |
| 2004/0000619 A1 | 1/2004 | Barriety | |
| 2004/0155157 A1 | 8/2004 | Bray | |
| 2007/0114327 A1 | 5/2007 | Dees et al. | |

FOREIGN PATENT DOCUMENTS

| | | |
|---|---|---|
| EP | 1531126 A1 | 5/2005 |
| GB | 2282996 A | 4/1995 |
| WO | WO03000547 A1 | 1/2003 |
| WO | WO2007031732 A1 | 3/2007 |

OTHER PUBLICATIONS

PCT Intl Search Report and Written Opinion for Application No. PCT/US2008/064719, dated Apr. 6, 2009, 14 pgs.

* cited by examiner

CONTROLLABLE WINGLETS

FIELD OF THE INVENTION

This invention relates to systems and methods for providing winglets, and more specifically, to systems and methods for providing winglets to enhance aircraft performance.

BACKGROUND OF THE INVENTION

In today's commercial transport industry, it is highly desirable to design aircraft configurations that yield reduced fuel burn per seat-mile, as fuel burn per seat-mile is a metric of fuel efficiency. Efficient aircraft configurations are ever more important as fuel costs continue to increase.

Winglets have been used to reduce aircraft fuel consumption. The winglets may reduce the induced drag of the aircraft and improve the lift-to-drag ratio, thereby improving fuel efficiency. However, previous winglets are typically designed to provide maximum drag reduction and ideal improvement to the lift-to-drag ratio under cruise flight conditions. Consequently, these winglets may not provide optimal fuel efficiency during non-cruise conditions, such as during climbs, takeoffs and landings. Since non-cruise conditions generally make up significant portions of a flight, maximum efficiency may not be realized by such winglet designs.

Moreover, the presence of winglets may increase the wing bending load on the main wings of an aircraft. This increased wing bending load may be especially pronounced when an aircraft experiences high load factor condition, e.g., high maneuver load conditions or high gust load conditions. Structural reinforcements that compensate for these induced load increases may result in additional wing weight. Therefore, novel systems and methods which enable winglets to maximize fuel efficient for most flight conditions, as well as reduce wing bending loads induced by the winglets, would have utility.

SUMMARY OF THE INVENTION

The present disclosure is directed to systems and methods for providing variable geometry winglets. Variable geometry winglets, as provided by embodiments of systems and methods in accordance with the present disclosure, may advantageously confer fuel efficiency in both cruise and non-cruise conditions. Moreover, these variable geometry winglets may also induce lower wing bending loads than winglets that do not possess variable geometry. Furthermore, certain embodiments of the variable geometry winglets may be reversibly canted inboard to reduce the total wingspan of an aircraft while it is on the ground, thereby enabling the aircraft to meet existing gate clearance requirements while maximizing airborne wingspan during flight.

In one embodiment, a winglet includes a base portion configured to attach to a wing. The winglet further includes a body portion. In turn, the body portion includes a controllable section configured to adjust a shape of the body portion. The controllable section includes at least one of a deflectable control surface, a shape memory alloy (SMA) bending plate, and a SMA torque tube. The base portion is configured to attach to the wing such that the body portion projects at an upward angle from the wing.

In another embodiment, a method for adapting an aircraft to a plurality of flight conditions comprises providing a winglet to each wing. The winglet includes a body portion. The body portion includes at least one of a deflectable control surface, a shape memory alloy (SMA) bending plate, and a SMA torque tube. Once the aircraft is moving through the atmosphere, the method further includes providing a winglet modification signal. The winglet is then modified based on the modification signal to at least one of reduce induced drag and redistribute a wing load. In an additional embodiment, a plurality of winglets may be modified asymmetrically to augment either the rolling moment or the yaw moment of the aircraft. In other words, asymmetrical winglet morphing, such as differentially morphing a first winglet and a second winglet, can generate a rolling moment and/or a yawing moment that augment similar moments generated by ailerons, spoilers, and/or rudders.

In an additional embodiment, an aircraft is disclosed. The aircraft includes a fuselage. A pair of wings is operatively coupled to the fuselage. The aircraft further includes a propulsion system, which is coupled either to the fuselage or the pair of wings. A winglet is coupled to each wing. The winglet comprises a base portion configured to attach to the wing. The winglet further comprises a body portion. In turn, the body portion includes at least one of a deflectable control surface, a shape memory alloy (SMA) bending plate, and a SMA torque tube. The base portion is configured to attach to the wing such that the body portion projects at an upward angle from the wing. In an additional embodiment, the aircraft includes an actuator configured to deflect the control surface. In another embodiment, the aircraft includes a thermal element configured to reversibly deform the SMA components.

In a further embodiment, the aircraft also includes a winglet control system. The winglet control system comprises an input component configured to obtain sensor data from one or more sensors. The sensor includes at least one of an air speed sensor, a gust sensor, an inertia load sensor, a look-ahead sensor, an accelerometer, a dynamic pressure sensor, an altimeter, a Mach sensor, and a fuel flow sensor. The winglet control system further comprises an analysis component configured to analyze sensor data to generate one or more winglet modification signals. Finally, the winglet control system further includes an output component configured to provide the one or more winglet modification signals to the actuator and the thermal element.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

BRIEF DESCRIPTION OF THE DRAWINGS

Embodiments of the present invention are described in detail below with reference to the following drawings.

DETAILED DESCRIPTION

The present invention relates to systems and methods for providing winglets to enhance aircraft performance. Many specific details of certain embodiments of the invention are set forth in the following description and in FIGS. 1-6 to provide a thorough understanding of such embodiments. The present invention may have additional embodiments, or may be practiced without one or more of the details described below.

Generally, embodiments of systems and methods in accordance with this disclosure provide variable geometry winglets. These variable geometry winglets are configured to change the conformation of their airflow surfaces in response to different flight conditions. Accordingly, the variable geometry winglets of the present disclosure may maximize fuel efficiency for both cruising and non-cruising flight conditions. Moreover, the variable geometry winglets are also capable of changing their conformation to reduce wing loads, such as wing loads associated with high maneuver load and high gust load conditions. Reduce wing loads may lead to weight savings as structural redundancies in the wings may be reduced. Thus, embodiments of the variable geometry winglets may enhance fuel efficiency, reduced aircraft operating cost, reduce $CO_2$ emission, and reduce generated noise.

Figure 1A:
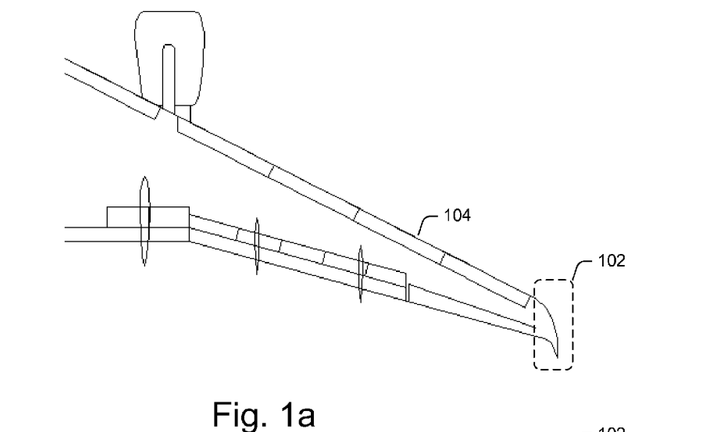
FIGS. 1a-1c illustrate a wing with an exemplary variable geometry winglet in accordance with an embodiment.
Figure 1B:
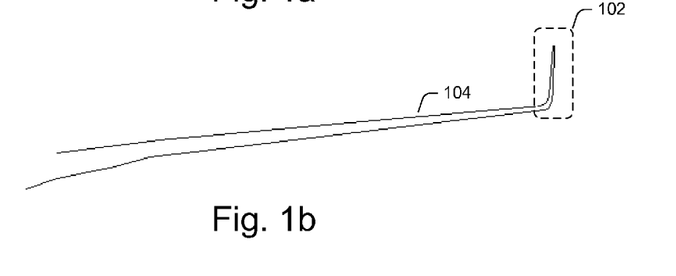
Figure 1C:
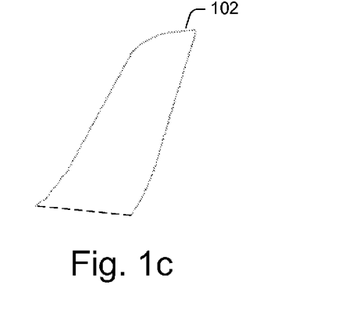

FIGS. 1a-1c illustrate a wing with an exemplary variable geometry winglet in accordance with an embodiment. Specifically, FIG. 1a is a plan view of the wing with the exemplary winglet 102. FIG. 1b is a front view of the wing with the exemplary winglet 102. Additionally, FIG. 1c is a side view of the exemplary winglet 102.

In various implementations, a winglet 102 may be disposed on a main wing 104 of an aircraft (e.g., starboard wing or port wing). As described above, each winglet 102 may be configured with variable wing geometry. In other words, the shape of the winglet 102 may be transformed or modified. As further described below, the transformation or modifications of the winglet 102 may be tailored for particular flight conditions and circumstances. Accordingly, the variable geometry of the winglet 102 may serve to enhance the flight characteristics of the aircraft.

For example, for an aircraft equipped with winglets 102 on both main wings 104, the winglets 102 may be symmetrically deflected, that is, deflect in a similar manner, to change the air pressure distribution over the outboard portions of each wing. In this way, the variable geometry may enable each winglet 102 to reduce the wing bending load on the each corresponding wing 104. In various implementations, such symmetrical deflections of the winglets 102 may be carried out under condition such as present or anticipated high-g maneuver or high gust load conditions. The reduction the wing bending load may enable the reduction of structural gage within the main wing, resulting a weight saving and improved fuel economy.

Moreover, the geometry of the winglets 102 may also be varied to improve the lift to drag ratio in a variety of flight conditions. For instance, while ordinary winglets are often tailored to provide maximum lift-to-drag during a particular phase of the flight (e.g., cruising flight), variable geometry winglets 102 may provide maximum lift-to-drag ratio during a variety of cruising and non-cruising flight conditions. Increases to the lift-to-drag ratio during different phases of a flight may further improve fuel economy.

In further embodiments, the winglets 102 may be canted inboard (towards the fuselage) to reduce the total wingspan of an aircraft while it is on the ground, thereby allowing the aircraft to meet existing gate clearance requirements. However, once the aircraft is airborne, winglets 102 in accordance with these embodiments may be canted outboard (away from fuselage). In this way, winglets 102 of these embodiments may enable the aircraft to generated additional lift by maximizing wingspan, as well as take advantage of the benefits provided by the winglets 102.

Figure 2:
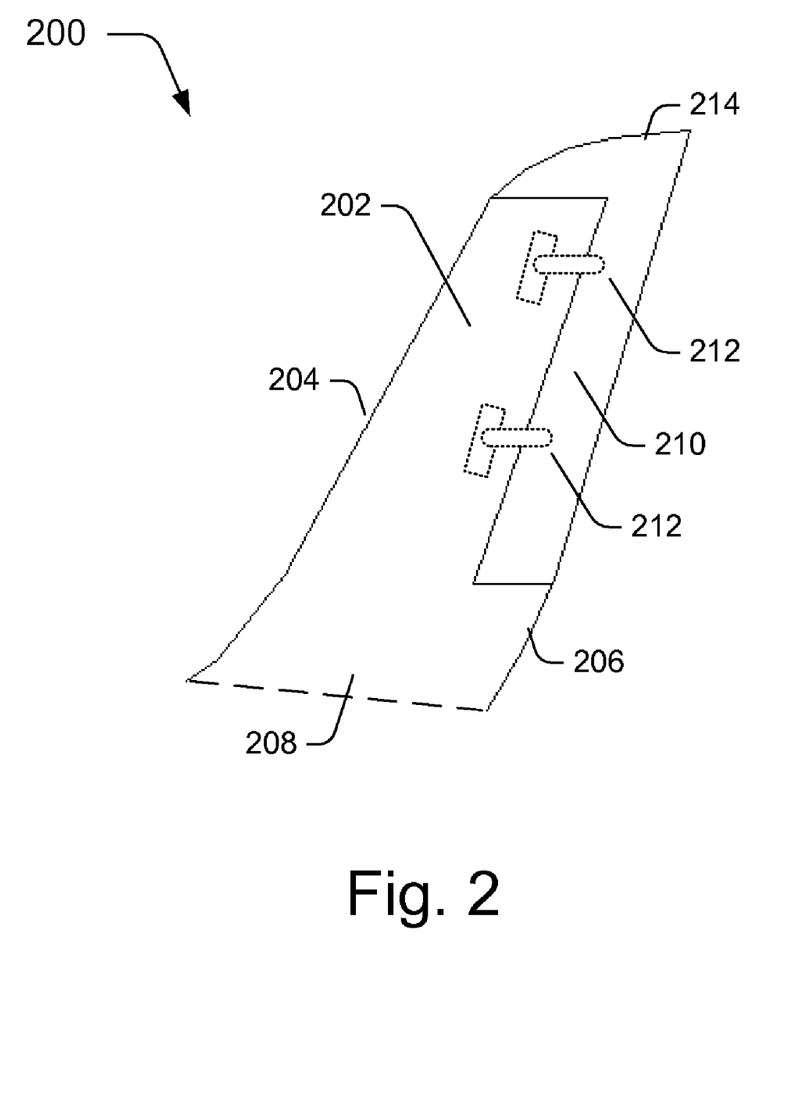
FIG. 2 is a side view of an exemplary variable geometry winglet that includes a control surface, in accordance with an embodiment.

FIG. 2 is an enlarged side view of an exemplary variable geometry winglet 200 that includes a control surface. It will be appreciated that the variable geometry winglet 200 may be constructed from various metallic, composite, or hybrid materials, such as aluminum, titanium, polymer, fiberglass, carbon-fiber reinforced plastic (CFRP), and the like.

According to various embodiments, the exemplary variable geometry winglet 200 includes a body portion 202. The body portion includes a leading edge 204 and a trailing edge 206. The variable geometry winglet also includes a base portion 208 configured to attach to an aircraft wing. Specifically, the base portion 208 may be coupled to an aircraft wing such that the winglet 200 projects at an upward angle from the aircraft wing. The winglet 200 further includes a control surface 210. The control surface 210 is positioned adjacent the trailing edge 204 of the body portion 202.

The control surface 210 may be connected to the body portion 206 of the variable geometry winglet 200 by one or more actuators 212. It will be appreciated that the one or more actuators 212 may include electromechanical actuators, hydraulic actuators, pneumatic actuators, and the like.

In some embodiments, the control surface 208 may further include a winglet tip horn 214. The winglet tip horn 214 is configured to increase the aerodynamic effectiveness of the control surface 210. Moreover, the winglet tip horn 214 may further reduce the loads on the one or more actuators 212 during deflection of the control surface 210.

The control surface 210 is configured to selectively deflect in response to various flight conditions. For instance, an aircraft may be equipped with a pair of winglets 200 on its wings. When such an aircraft is in 1-g cruising flight, the control surfaces 210 on the winglets 200 are not deflected. Accordingly, the span-wise lift distribution on each wing is optimized (e.g., near elliptic in the absence of transonic effects). In turn, induced drag is reduced and the lift-to-drag ratio of the aircraft is maximized.

However, when the aircraft is in a non-cruise condition, (e.g., 1-g climb, 1-g descent), or when the aircraft is in takeoff or landing conditions, the control surfaces 210 may be deflected (e.g., anterior portion pivoted toward or away from the aircraft fuselage). The deflections may optimize performance, that is, maximize fuel efficiency, for each of the different flight conditions or phases by modify airflow over each of the winglets 200.

Additionally, the control surfaces 210 may also be deployed to redistribute wing loads. Redistribution of wing loads may enhance the structural robustness of an aircraft wing and reduce the possibility of structural or material fatigue. Wing load redistribution may be especially useful in instances when the aircraft experiences high-g conditions. These high-g conditions may include a pull up maneuver, a wind-up turn, or a gust-induced condition. In these high-g conditions, the control surfaces 210 of the winglets 200 may be rapidly deflected to reduce wing loads. For example, the anterior portions of the pair of control surfaces 210 may be pivoted inward to spoil outboard wing lift and redistribute span-wise wing load inboard. Consequently, the inboard wing structural loads may be reduced. The ability to redistribute wing loads using winglet mounted control surfaces, such as control surfaces 210, produces additional benefits. For instance, the number and/or size of gage areas, as well as the number and/or size of reinforcements in a wing may be reduced, leading to weight savings and increased fuel efficiency.

Figure 3:
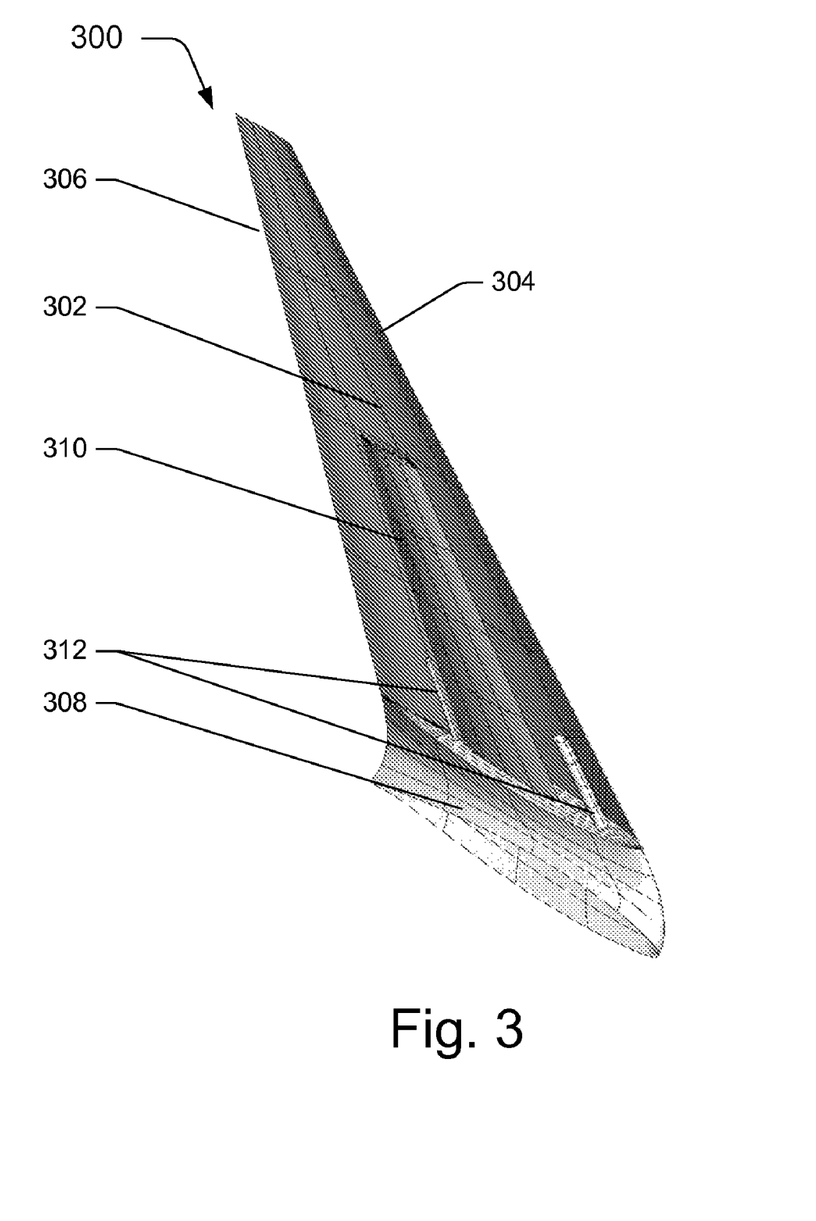
FIG. 3 is an isometric view of an exemplary morphable variable geometry winglet, in accordance with an embodiment.

FIG. 3 is an enlarged isometric view of an exemplary morphable variable geometry winglet 300. According to various embodiments, the morphable variable geometry winglet 300 includes a rigid body structure 302. The rigid body structure 302 further comprises a leading edge 304, and a trailing edge 306. The morphable variable geometry winglet 300 also includes a super elastic base structure 308 connected to the rigid body structure 306. The super elastic base structure 308 is configured for attachment to an aircraft wing. Specifically, the super elastic base structure 308 may be coupled to an aircraft wing such that the winglet 300 projects at an upward angle from the aircraft wing.

The rigid body structure 306 may be constructed from a relatively non-flexible metallic, composite, or hybrid material, (e.g., aluminum, titanium, polymer, fiberglass, carbon-fiber reinforced plastic, and the like). In one embodiment, the rigid body structure 306 is a hollow tubular structure. In contrast, the super elastic base structure 308 may be constructed from a flexible material. In one particular instance, the super elastic base structure 308 is also a hollow tubular structure that is configured to be joined to the hollow rigid structure 306. According to one embodiment, the super elastic base structure 308 may be constructed from a pliable shape memory alloy (SMA). SMA is also commonly known as "smart alloy" or "memory metal."

It will be appreciated that a SMA may be a "two-way" SMA, in other words, the SMA is configured to retain a plurality of geometries. For example, the SMA may retain a first geometry that is associated with a low temperature, and retain a second geometry that is associated with a high temperature. In this way, the geometry of the SMA may be controllably modified by variability in thermal energy.

In the embodiment where the super elastic base structure 308 is constructed from a SMA, the heat for the modification of the SMA may be from one or more thermal elements, such as electrical resistance elements (not shown). Alternatively, in other embodiments, a change in ambient temperature, such as a change caused by difference in altitude, may be used to modify SMA geometry. Accordingly, the super elastic base structure 308 may enable the winglet 300 to bend in various directions to adapt to different flight conditions.

In additional embodiments, the winglet 300 further includes one or more SMA bending plate 310. Alternatively, some embodiments further include one or more SMA torque tubes 312. Moreover, it will be appreciated that still other embodiments includes both SMA bending plates 310 and SMA torque tubes 312.

Figure 4A:
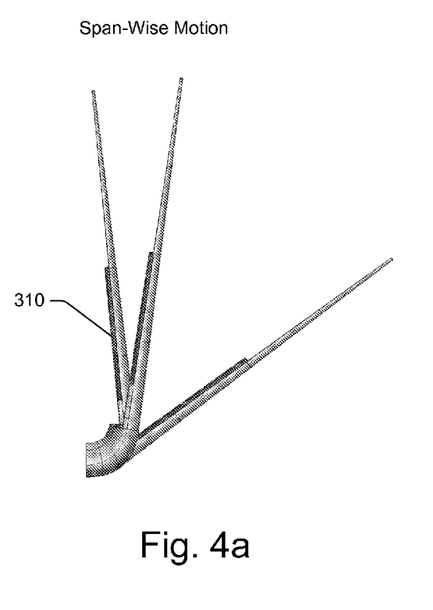
FIGS. 4a and 4b illustrate the controlled deformation of the exemplary morphable variable geometry winglet shown in FIG. 3, in accordance with an embodiment.
Figure 4B:
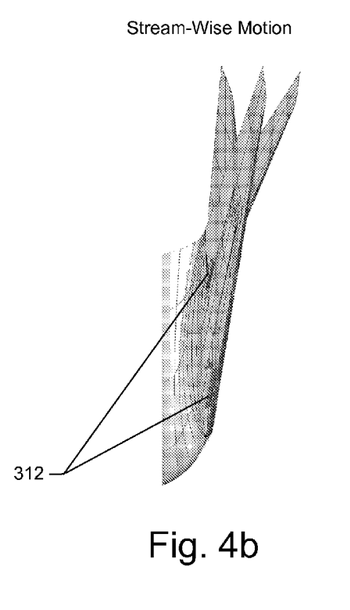

The one or more SMA torque tubes 312 may be further constructed from "two-way" SMA. In one implementation, at least a portion of each of the one or more SMA torque tubes 312 is positioned inside the hollow tubular rigid body structure 306. Likewise, in another implementation, each of the one or more SMA torque tubes 312 is also partially positioned inside the super elastic structure 308. In various embodiments, the one or more SMA torque tubes 312 may be interconnected to the rigid body structure 306 and the super elastic base structure 308. Further, as shown in FIG. 4b, the SMA torque tubes 312 may be configured so that their geometry variations may cause the stream-wise twist of the winglet 300. As shown in FIG. 4b, stream-wise twist is the twist of the winglet 300 relative to a direction that faces the airflow.

In additionally embodiments, at least one of the SMA bending plate 310 and the SMA torque tube 312 may be further configured to change the camber of the winglet 300. In one instance, the one or more SMA bending plates 310 may be configured to cause an expansion or contraction of at least a portion of the winglet 300. This expansion or contraction of the winglet 300 may result in an increase or decrease in the camber of the winglet 300. In another instance, the one or more SMA bending plate 310 may be configured to cause at least a portion of the winglet 300 to flex or warp, thereby increasing or decreasing the camber of the winglet 300. It will be appreciated that in further embodiments, the one or more SMA torque tubes 312 may be configured to achieve a change in the camber of winglet 300, either independently or in conjunction with the SMA bending plates 310, in substantially the same manner.

It will be appreciated that the various reversible deformations of the super elastic base structure 308, the one or more SMA bending plate 310, and the SMA torque tubes 312 may be controlled to produce at least the same effect as the deflection of the control surface 210 describe in FIG. 2. These effects include lift-to-drag ratio optimization and wing load redistribution.

In other embodiments, the winglet 300 may be further configured to include a control surface, such as the control surface 210 described with respect to FIG. 2. In some of these embodiments, the various SMA components and the control surface may be activated simultaneously to adapt the winglet 300 to different flight conditions. Alternately, the SMA component and the control surface may be activated non-simultaneously to achieve the desired response to changes in flight condition.

In further embodiments, the winglet 300 may cant inboard (towards the fuselage) to reduce the total wingspan of an aircraft while it is on the ground, thereby allowing the aircraft to meet existing gate clearance requirements. However, once the aircraft is airborne, winglet 300 in accordance with these embodiments may be canted outboard (away from fuselage). In this way, winglet 300 of these embodiments may enable the aircraft to generated additional lift by maximizing wingspan, as well as take advantage of the benefits provided by the winglet 300.

In a particular embodiment, the winglet 300 may be configured to cant inboard during ground operations. The cant of the winglet 300 may be implemented such that when the corresponding wing bends slightly under a full fuel load, the total wingspan of the aircraft nevertheless meets the gate clearance requirements. During flight, the winglet 300 may be configured to extend by canting away from the fuselage. It will be appreciated that the winglet 300 may cant outboard to any angle as long as the winglet 300 functions as a winglet rather than as a fixed lift-generating portion of the wing.

In various implementations, one or more SMA components of the winglet 300 may be activated to change the geometry of the winglet 300. For example, as described above, the one or more SMA components may be configured to change from a first geometry to a second geometry, and vice versa, in response to the temperature differences at various altitudes (e.g., ground level temperature vs. cruising altitude temperature). Accordingly, the winglet 300 may cant autonomously between the inboard and outboard angles as the aircraft performs flight and landing operations. In another implementation, the SMA thermal elements may be used to actively control the canting of the winglet 300 between the inboard and outboard angles.

Figure 5:
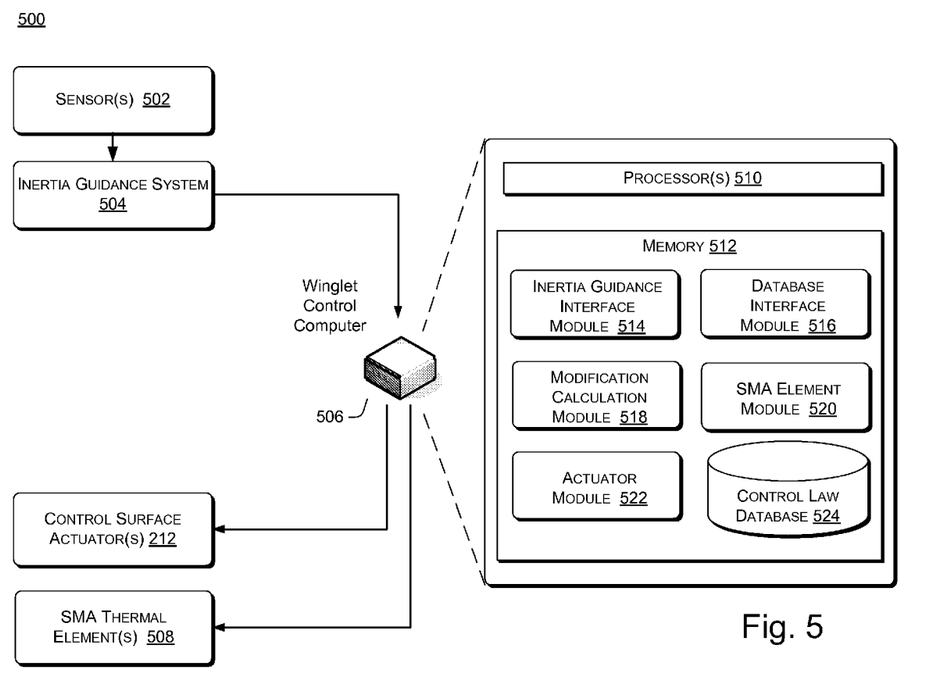
FIG. 5 is a block diagram depicting an exemplary system for controlling the variable geometry winglets shown in FIG. 2 and FIG. 3, in accordance with an embodiment.

FIG. 5 is a block diagram depicting an exemplary system for controlling the variable geometry winglet. The system 500 includes one or more sensors 502, an inertia guidance system 504, and a winglet control computer 506. The winglet control computer 506 may be used to send control signals to the one or more control surface actuators 212 (as described in FIG. 2), or the one or more SMA thermal elements 508 (as described in FIG. 3).

The one or more sensors 502 may be configured to receive various flight control data. Examples of sensors 502 may include an air speed sensor, a gust sensor for each wing, an inertia load sensor, a look-ahead sensor, an accelerometer, a dynamic pressure sensor, an altimeter, a Mach sensor, a fuel flow sensor, and the like. However, it will be appreciated that the one or more sensors 502 may include other sensors that provide flight data. The inertia guidance system 504 is generally configured to ascertain the path of an aircraft based on the one or more data received from the sensors 502. Accordingly, the inertia guidance system 504 may be capable of determining flight characteristics such as the position, velocity, orientation, altitude, and angular velocity of the aircraft. These flight characteristics may indicate high-g or gust-induced conditions.

The winglet control computer 506 may be configured to receive the determined flight characteristics from the inertia guidance system 504. Additionally, in certain embodiments, the winglet control computer 506 is also capable of obtaining sensor data directly from the one or more sensors 502.

As shown in FIG. 5, the winglet control computer 506 has processing capabilities and memory suitable to store and execute computer-executable instructions. In one embodiment, the capture maneuver computer 506 includes one or more processors 512 and memory 514. The memory 512 may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

Modules which enable the winglet control computer 506 to perform various functions may be stored in the memory 512. In one embodiment, the modules include an inertia guidance system interface module 514, a database interface module 516, a modification calculation module 518, a SMA element module 520, and actuator module 522. These modules may be implemented as software or computer-executable instructions that are executed by the one or more processors 508 to perform the functions described below. A control law database 524 is also stored in memory 512.

For instance, the inertia guidance interface module 514 is configured to communicate with the inertia guidance system 504. The communication may be established over an electrical connection, an optical connection, and the like. According to various embodiments, the inertia guidance interface module 514 enables the winglet control computer 506 to receive various flight characteristics and flight sensor data.

The database interface module 516 enables the reading of data from the control law database 524. In some embodiments, the control law database 524 contains algorithms that are used to provide winglet control signals that govern the deflections of winglet control surfaces or the deformation of winglet SMA components.

The modification calculation module 518 is configured to provide the deflection and deformation signals to winglets by processing flight sensor inputs and flight characteristics based on the control laws from control law database 524. For instance, in one implementation, the modification calculation module 518 may process data inputs from the look-ahead sensors and a plurality of accelerometers by the control laws to derive winglet control signals. In another embodiment, the modification calculation module 518 may further include Kalman filter or time jerk (time derivative of acceleration) algorithms. These algorithms may enable the modification calculation module 56 to anticipate changes in flight conditions based on the data inputs from sensors 502. In other embodiments, the modification calculation module 518 may further include a proportional control algorithm or an integral-proportional control algorithm. In this way, the modification calculation module 518 may optimally or preemptively compute and provide the winglet control signals.

In an additional embodiment, the modification calculation module 518 may be configured to provide individual winglet control signals to each wing. For example, the modification calculation module 518 may process sensor data from a right gust sensor independent of sensor data from a left gust sensor. In the turn, the modification calculation module 518 may provide separate winglet control signals that alleviate either left wing gust loads or right wing gust loads when the gust loads are not identical. In another example, the modification calculation module 518 may be further configured to generate separate control signals to cause asymmetric winglet deflections or deformations. Such winglet deflections or deformations may be used to generate side forces for yaw or rolling moments of the aircraft. For instance, asymmetrical winglet morphing, such as differentially morphing a first winglet and a second winglet, can generate a rolling moment and/or a yawing moment that augment similar moments generated by ailerons, spoilers, and/or rudders. Moreover, the asymmetric winglet modification signals may be combined with symmetric winglet modification signals to produce superimposed signals that achieve multiple purposes (e.g., simultaneous wing load distribution and side force generation).

The actuator module 522 may be employed to provide the winglet control signals from the modification calculation module 518 to the actuators 212. As described above, the actuators 212 are configured to manipulate the control surface 210 of winglet 200. Specifically, the winglet control signals activate the actuators 212, which in turn deflect the control surfaces 210. Similarly, the SMA element module 522 may be employed to provide the winglet control signals to activate one or more SMA thermal elements 508. As described above, the one or more SMA elements generate thermal energy to manipulate variable geometry winglets 300 that includes SMA components.

It should be appreciated that the illustrated winglet control computer 506 is only one example of a suitable control system and is not intended to suggest any limitation as to the scope of use or functionality of a system for controlling the winglets. Other avionic environments and/or configurations may be suitable for use with the invention. For example, the exemplary winglet control computer 506 may a part of a flight management computer (FMC). In other exemplary instances, one or more of the modules 518-522 may be directly implemented on the FMC, the autopilot 204, or any other suitable avionic component of a flight management system (FMS), navigation system, or any avionic system present in an aircraft that is capable of receiving, processing, and storing data.

Moreover, it will be appreciated that the exemplary morphable variable geometry winglet 300, as described in FIG. 3, may be deformed without the use of SMA thermal elements 310. Instead, a change in ambient temperature, such as a change associated with changing altitude, may be sufficient to controllably deform pre-configured SMA components of the winglet 300. Consequently, in one embodiment, morphable variable geometry winglet 300 may be configured to vary its geometry to produce optimal fuel efficiency or wing load distribution as a function of aircraft altitude.

Figure 6:
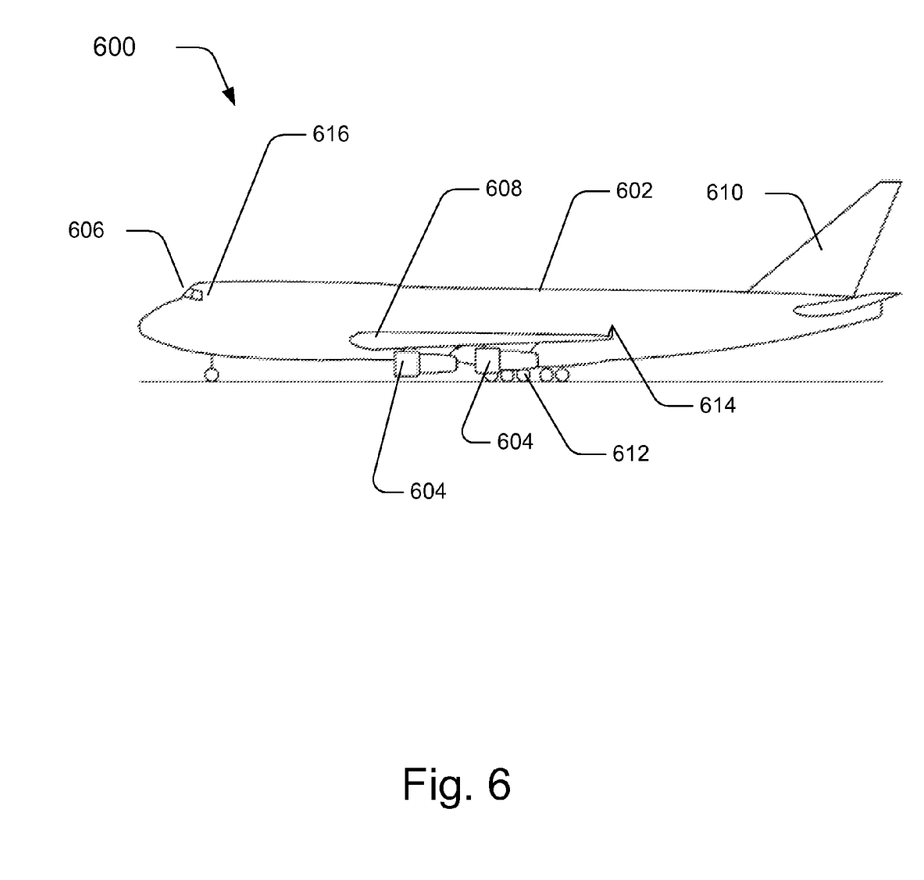
FIG. 6 is a side elevational view of an aircraft equipped with variable geometry winglets and a corresponding winglet control system, in accordance with another embodiment.

FIG. 6 is a side elevational view of an aircraft 600 in accordance with an embodiment of the present invention. In general, except for one or more systems in accordance with the present invention, the various components and subsystems of the aircraft 400 may be of known construction and, for the sake of brevity, will not be described in detail herein. As shown in FIG. 6, the aircraft 600 includes one or more propulsion units 604 coupled to a fuselage 602, a cockpit 606 in the fuselage 602, wing assemblies 608 (or other lifting surfaces), a tail assembly 610, a landing assembly 612, a control system (not visible), and a host of other systems and subsystems that enable proper operation of the aircraft 600. The wing assemblies 608 are equipped with one or more variable geometry winglets 614 in accordance with various embodiments described above. It will be appreciated that the wing assemblies 608 may be of any lift generating configuration. For example, these configurations may include a pair of dihedral wings, a pair of anhedral wings, a pair of polyhedral wings (i.e., having both dihedral and anhedral characteristics), a pair of aft-swept wings, a pair of forward-swept wings, and the like. Additional configuration examples include wings that possess aerodynamic twist, which is the rotation of one edge of a wing in a downward direction toward the wing tips. Moreover, in some embodiments, the variable geometry winglets 614 may be blended with the wing assemblies 608 so that the variable geometry winglets 614 are blended extensions of the wing assemblies 608.

Finally, at least one component of a winglet control system 616 formed in accordance with an embodiment disclosed in FIG. 5 is located within the fuselage 602. However, components of the winglet control system 614 may be distributed throughout the various portions of the aircraft 600.

Although the aircraft 600 shown in FIG. 6 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of system and methods in accordance with the present invention may be utilized in other aerial vehicles.

Embodiments of systems and methods in accordance with the present disclosure may provide significant advantages over the prior art. For example, the variable geometry winglets may adapt to different flight conditions. Accordingly, the variable geometry winglets may advantageously confer fuel efficiency in both cruise and non-cruise conditions. The variable geometry winglets may also induce lower wing bending loads than winglets that do not possess variable geometry. The ability of the variable geometry winglets to redistribute wing loads in different flight conditions may also reduce the structural weight of wings, resulting in increased fuel economy. Finally, certain embodiments of the variable geometry winglets may reversibly reduce the total wingspan of an aircraft while it is on the ground. Thus, the aircraft may meet existing gate clearance requirements while benefiting from maximized wingspan and winglets during flight.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A winglet, comprising:
   a base portion to attach to a distal portion of a wing; and
   a body portion that includes a controllable section to adjust a shape of the body portion, the controllable section contains at a shaped memory alloy (SMA) bending plate that bends the body portion span-wise relative to the wing and a SMA torque tube that twists the body portion stream-wise,
   wherein the base portion attaches to the wing such that the body portion projects at an upward angle from the wing.

2. The winglet of claim 1, wherein each of the SMA bending plate and the SMA torque tube is interconnected to the base portion and the body portion.

3. The winglet of claim 1, wherein the body portion further includes a deflectable control surface that is positioned on the body portion and deflects with respect to the body portion, further comprising an actuator that connects the deflectable control surface to the body portion, the actuator to deflect the deflectable control surface.

4. The winglet of claim 1, wherein the base portion includes a bendable super elastic base structure that connects to the body portion.

5. The winglet of claim 4, wherein the super elastic base structure includes at least a SMA portion, further comprising a SMA heating element to reversibly deform the SMA portion.

6. The winglet of claim 1, further comprising a SMA heating element to reversibly deform at least one of the SMA bending plate or the SMA torque tube.

7. The winglet of claim 1, wherein at least one of the SMA bending plate or the SMA torque tube changes a camber of the winglet.

8. A method for adapting an aircraft to a plurality of flight conditions, comprising:
   providing a plurality of winglets, each of the winglets coupled to a distal end of a different wing of a pair of wings, each of the winglets including a corresponding body portion that comprises, a shape memory alloy (SMA) bending plate to bend the body portion span-wise relative to a corresponding wing, and a SMA torque tube that twists the body portion stream-wise;
   providing a first winglet modification signal that reversibly deforms at least one of the SMA bending plate or the SMA torque tube; and
   modifying at least one of the winglets based on the modification signal.

9. The method of claim 8, wherein providing a plurality of winglets further includes providing a deflectable control surface on each winglet, and providing each deflectable control surface with an actuator that connects the deflectable control surface to the body portion, the actuator to deflect the deflectable control surface.

10. The method of claim 9, further comprising providing a control surface deflection signal and wherein modifying the winglet includes deflecting the deflectable control surface in response to the control surface deflection signal.

11. The method of claim 10, wherein providing a plurality of winglets includes providing a base portion to each winglet that connects a corresponding body portion to a corresponding wing, each of the base portion includes a super elastic base structure having a bendable SMA portion.

12. The method of claim 10, further comprising providing a heating element that reversibly deforms one of the SMA bending plate, the SMA torque tube, or the SMA portion.

13. The method of claim 8, wherein providing the wing modification signal includes providing the winglet modification signal to modify at least one of the plurality of winglets to at least one of minimize a ground wingspan of the corresponding wing, reduce induced drag on the corresponding wing during flight, augment one of a rolling movement or a yaw movement of the aircraft, or redistribute a wing load on the corresponding wing during flight.

14. The method of claim 8, wherein modifying the at least one winglet further includes reversibly deforming at least one of the SMA bending plate or the SMA torque tube to change the camber of the winglet body portion.

15. The method of claim 8, wherein providing the winglet modification signal includes providing the winglet modification signal based on sensor data, the sensor data including at least one of air speed sensor data, gust sensor data, inertia load sensor data, look-ahead sensor data, accelerometer data, dynamic pressure sensor data, altimeter data, Mach sensor data, or fuel flow sensor data.

16. The method of claim 15, wherein providing the winglet modification signal includes analyzing the sensor data using at least one of a Kalman filter algorithm, a time jerk algorithm, a proportional control algorithm, or an integral-proportional control algorithm.

17. An aircraft comprising:
a fuselage;
a pair of wings operatively coupled to the fuselage; and
a winglet coupled to each wing, the winglet comprising:
    a base portion to attach to the wing;
    a body portion including a shape memory alloy (SMA) bending plate to bend the body portion span-wise to at least one of the pair of wings, and at least one SMA torque tube to perform stream-wise twist of the body portion; and
    a super elastic SMA base portion attached to the wing and the body portion, the super elastic base portion having a hollow SMA structure that at least partially encloses the SMA bending plate and the at least one SMA torque tube,
    wherein the super elastic base portion attaches to the wing such that the body portion projects at an upward angle from the wing.

18. The aircraft of claim 17, wherein the body portion further includes a deflectable control surface, further comprising an actuator to deflect the deflectable control surface and a thermal element to reversibly deform the SMA bending plate or the a SMA torque tube.

19. The aircraft of claim 18, further comprising a winglet control system that includes:
    an input component to obtain sensor data from one or more sensors, the sensor including at least one of an air speed sensor, gust sensor data, inertia sensor data, look-ahead sensor data, and accelerometer data;
    an analysis component to analyze the sensor data to generate one or more winglet modification signals; and
    an output component to provide the one or more winglet modification signal to at least one of the actuator or the thermal element.

20. The aircraft of claim 17, wherein the pair of wings includes one of a pair of dihedral wings, a pair of anhedral wings, a pair of polyhedral wings, a pair of aft-swept wings, a pair of forward-swept wings, a pair of aerodynamically-twisted wings, or a pair of blended wings.

* * * * *